United States Patent
Shechtman et al.

(10) Patent No.: US 11,062,691 B2
(45) Date of Patent: Jul. 13, 2021

(54) VOICE TRANSFORMATION ALLOWANCE DETERMINATION AND REPRESENTATION

(71) Applicant: International Business Machines Corporation, Armonk, NY (US)

(72) Inventors: Vyacheslav Shechtman, Haifa (IL); Alexander Sorin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 16/409,958

(22) Filed: May 13, 2019

(65) Prior Publication Data

US 2020/0365135 A1 Nov. 19, 2020

(51) Int. Cl.
*G10L 13/033* (2013.01)
*G06N 20/10* (2019.01)
(Continued)

(52) U.S. Cl.
CPC .......... *G10L 13/033* (2013.01); *G06F 3/0484* (2013.01); *G06F 3/165* (2013.01);
(Continued)

(58) Field of Classification Search
CPC ....... G10L 13/00; G10L 13/02; G10L 13/027; G10L 13/033; G10L 13/0335; G10L 13/04; G10L 13/047; G10L 13/06; G10L 13/07; G10L 17/00; G10L 17/02; G10L 17/18; G10L 17/22; G10L 17/24; G10L 16/16; G10L 16/167; G10L 16/24; G10L 21/00; G10L 21/003; G10L 21/007; G10L 21/01; G10L 21/013; G10L 21/02; G10L 21/02; G10L 21/10; G10L 21/12; G10L 21/14; G10L 25/48; G10L 25/51; G10L 25/54; G10L 25/60; G10L 25/63; G10L 25/66; G10L 25/69; G10L 25/72; G10L 25/75;
(Continued)

(56) References Cited

U.S. PATENT DOCUMENTS

7,117,159 B1 * 10/2006 Packingham ........... G10L 13/00
704/275
7,689,421 B2 3/2010 Li et al.
(Continued)

*Primary Examiner* — Andrew C Flanders
(74) *Attorney, Agent, or Firm* — Gregory J Kirsch (57) ABSTRACT

Embodiments of the present systems and methods may provide techniques that provide the capability to automatically generate allowance intervals for voice personas that meet desired requirements for realism and fidelity. For example, a method for voice persona generation may be implemented in a computer system comprising a processor, memory accessible by the processor, and computer program instructions stored in the memory and executable by the processor, the method comprising: displaying to a user, a plurality of user-selectable voice persona parameters that control features of a synthesized voice signal, and displaying, in conjunction with each of at least some of plurality of user-selectable voice persona parameters, voice transformation allowance intervals of the voice persona parameters, accepting from a user, a selection of at least one user-selectable voice persona parameter, and generating a synthesized voice signal based on the selected at least one user-selectable voice persona parameter.

20 Claims, 6 Drawing Sheets

(51) Int. Cl.
  *G06F 3/0484* (2013.01)
  *G06F 3/16* (2006.01)
  *G10L 25/69* (2013.01)
  *G06N 3/08* (2006.01)
  *G10L 13/047* (2013.01)
  *G06N 7/00* (2006.01)

(52) U.S. Cl.
  CPC ............ *G06N 3/08* (2013.01); *G06N 7/005* (2013.01); *G06N 20/10* (2019.01); *G10L 13/047* (2013.01); *G10L 25/69* (2013.01)

(58) Field of Classification Search
  CPC ....... G10L 2021/0135; G10L 2021/105; G10L 2021/065; G10L 2013/021; G06F 40/00; G06F 40/20; G06F 40/40; G06F 3/0484; G06F 3/16; G06F 3/162; G06F 3/165; G06F 3/167; G06N 7/005; G06N 3/08; G06N 20/10
  See application file for complete search history.

(56) References Cited

U.S. PATENT DOCUMENTS

| | | | |
|---|---|---|---|
| 9,269,347 | B2 | 2/2016 | Latorre-Martinez et al. |
| 9,978,359 | B1* | 5/2018 | Kaszczuk ............... G10L 13/02 |
| 9,984,700 | B2 | 5/2018 | Cohen et al. |
| 10,360,716 | B1* | 7/2019 | van der Meulen ..... G06T 13/40 |
| 10,692,484 | B1* | 6/2020 | Merritt ................... G10L 25/24 |
| 2003/0028380 | A1* | 2/2003 | Freeland ................. G10L 13/00 704/260 |
| 2005/0060155 | A1* | 3/2005 | Chu ........................ G10L 13/00 704/269 |
| 2006/0287865 | A1* | 12/2006 | Cross, Jr. ................ G10L 15/22 704/275 |
| 2007/0233489 | A1* | 10/2007 | Hirose .................... G10L 13/06 704/258 |
| 2009/0006096 | A1* | 1/2009 | Li ........................... G10L 13/08 704/260 |
| 2012/0016674 | A1 | 1/2012 | Basson et al. |
| 2013/0080155 | A1* | 3/2013 | Tachibana ............... G10L 13/02 704/10 |
| 2013/0080172 | A1* | 3/2013 | Talwar .................... G10L 25/69 704/260 |
| 2013/0268275 | A1* | 10/2013 | Tachibana ............... G10L 13/07 704/260 |
| 2014/0025381 | A1* | 1/2014 | Wang ...................... G10L 13/00 704/260 |
| 2014/0350921 | A1* | 11/2014 | Killalea ................ G06F 40/295 704/9 |
| 2016/0064033 | A1* | 3/2016 | Koul ....................... G10L 13/10 704/270 |
| 2016/0071302 | A1* | 3/2016 | Meadows ............... G10L 21/10 345/473 |
| 2016/0240215 | A1* | 8/2016 | Suess ...................... G10L 25/69 |
| 2018/0336881 | A1* | 11/2018 | Reber ....................... G06N 3/02 |
| 2018/0358008 | A1* | 12/2018 | Johnson, Jr. ............ G10L 15/22 |
| 2019/0236148 | A1* | 8/2019 | DeFelice ................. G06F 40/56 |
| 2020/0082807 | A1* | 3/2020 | Kim ...................... G10L 13/047 |
| 2020/0098353 | A1* | 3/2020 | Olabiyi ................... G10L 15/16 |

* cited by examiner

VOICE TRANSFORMATION ALLOWANCE DETERMINATION AND REPRESENTATION

BACKGROUND

The present invention relates to techniques that provide the capability to automatically generate allowance intervals for tunable parameters during artificial voice persona generation process, so that the generated voice persona meets desired requirements for realism and fidelity.

Voice morphing/transformation technology has been long used for gaming and movie production and has recently become available for Text-To-Speech (TTS) synthesis. Voice morphing/transformation technology can be used in TTS applications for generating voices for different human and non-human (imaginary) personalities. Typically, a controllable voice morphing platform has several parameters that are represented and controlled by Graphic User Interface (GUI) controls. Such controls may be either continuous or discreet and may be used to modify the "real" speech. Real speech may be human recordings or TTS system output.

Usually not all the possible settings of the GUI controls result in high quality speech that is, for example, free of artifacts, that produce a distinct voice personality, compared to the initial voice, or that produce human-like speech. Conventional approaches do not provide an automated way to guide the process of the Voice Persona generation, so voice generation is typically performed manually by repeatedly modifying the voice creation controls and listening to the generated audio.

Accordingly, a need arises for techniques that provide the capability to automatically generate allowance intervals for tunable parameters during artificial voice persona generation process, so that the generated voice persona meets desired requirements for realism and fidelity.

SUMMARY

Embodiments of the present systems and methods may provide techniques that provide the capability to automatically generate allowance intervals for tunable parameters during artificial voice persona generation process, so that the generated voice persona meets desired requirements for realism and fidelity. In embodiments of the present systems and methods, automated allowance interval determination may be provided to assist in voice persona generation. For example, allowance intervals may include a High Quality allowance (HQA), an Identical Speaker allowance (ISA), and a Human Speaker allowance (HSA).

For example, in an embodiment, a method for voice persona generation may be implemented in a computer system comprising a processor, memory accessible by the processor, and computer program instructions stored in the memory and executable by the processor, the method comprising: displaying, at the computer system, to a user, a plurality of user-selectable voice persona parameters that control features of a synthesized voice signal, and displaying, in conjunction with each of at least some of plurality of user-selectable voice persona parameters, voice transformation allowance intervals of the voice persona parameters, accepting, at the computer system, from a user, a selection of at least one user-selectable voice persona parameter, and generating, at the computer system, a synthesized voice signal based on the selected at least one user-selectable voice persona parameter.

In embodiments, the displayed voice transformation allowance interval ranges may be determined by: a) generating a synthesized voice signal, b) evaluating the synthesized voice signal based on a quality of the synthesized voice signal, a naturalness of the synthesized voice signal, and a persona of the synthesized voice signal, and performing a binary search process including repeating a) and b) to determine at least one edge of a voice transformation allowance interval.

The naturalness of the synthesized voice signal may be determined by: generating an embedding of the synthesized voice signal, and applying a binary classifier trained using at least some artificially generated negative examples. The binary classifier may be also trained using at least some human speech as positive examples, the positive examples and the negative examples may be represented by embedding vectors, and embedding vectors of the negative examples may be selected outside of a convex hull of the embedding vectors of the positive examples. The classifier may be a non-linear (kernel) support vector machine classifier or an artificial neural network probabilistic classifier. The voice transformation allowance interval may be displayed superimposed on a display of a user-selectable voice persona parameter. The voice transformation allowance interval associated may be displayed adjacent to a display of a user-selectable voice persona parameter.

In an embodiment, a system for voice persona generation may comprise a processor, memory accessible by the processor, and computer program instructions stored in the memory and executable by the processor to perform: displaying, on a display of the system, to a user, a plurality of user-selectable voice persona parameters that control features of a synthesized voice signal, and displaying, in conjunction with each of at least some of plurality of user-selectable voice persona parameters, voice transformation allowance intervals of the voice persona parameters, accepting, at an input interface of the system, from a user, a selection of at least one user-selectable voice persona parameter, and generating a synthesized voice signal based on the selected at least one user-selectable voice persona parameter.

In an embodiment, a computer program product for voice persona generation may comprise a non-transitory computer readable storage having program instructions embodied therewith, the program instructions executable by a computer system comprising a processor, memory accessible by the processor, and computer program instructions stored in the memory and executable by the processor, to cause the computer to perform a method comprising: displaying, at the computer system, to a user, a plurality of user-selectable voice persona parameters that control features of a synthesized voice signal, and displaying, in conjunction with each of at least some of plurality of user-selectable voice persona parameters, voice transformation allowance intervals of the voice persona parameters, accepting, at the computer system, from a user, a selection of at least one user-selectable voice persona parameter, and generating, at the computer system, a synthesized voice signal based on the selected at least one user-selectable voice persona parameter.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques that provide the capability to semi-automatically generate voice personas that meet desired requirements for realism and fidelity. In embodiments of the present systems and methods, automated allowance interval determination may be provided to assist in voice persona generation. For example, allowance intervals may include a High Quality allowance (HQA), an Identical Speaker allowance (ISA), and a Human Speaker allowance (HSA).

Assume a user, such as a Voice Personality designer, wants to create a certain voice personality P1, which may be determined by a certain parameter values, each parameter having a confined range of possible values, from an initial voice personality P0 having an initial set of parameter values. The user may select a component to modify, and the system may automatically determine the allowance intervals for that parameter based on the specific text/audio inputs and initial parameter settings P0. The system may then present the determined allowance intervals, for example, visually to the user by appropriate coloring of the controls, according to color legends. This automatic allowance representation guidance may assist the user on the Voice Persona design process to make it seamless and improve speed and efficiency.

Figure 1:
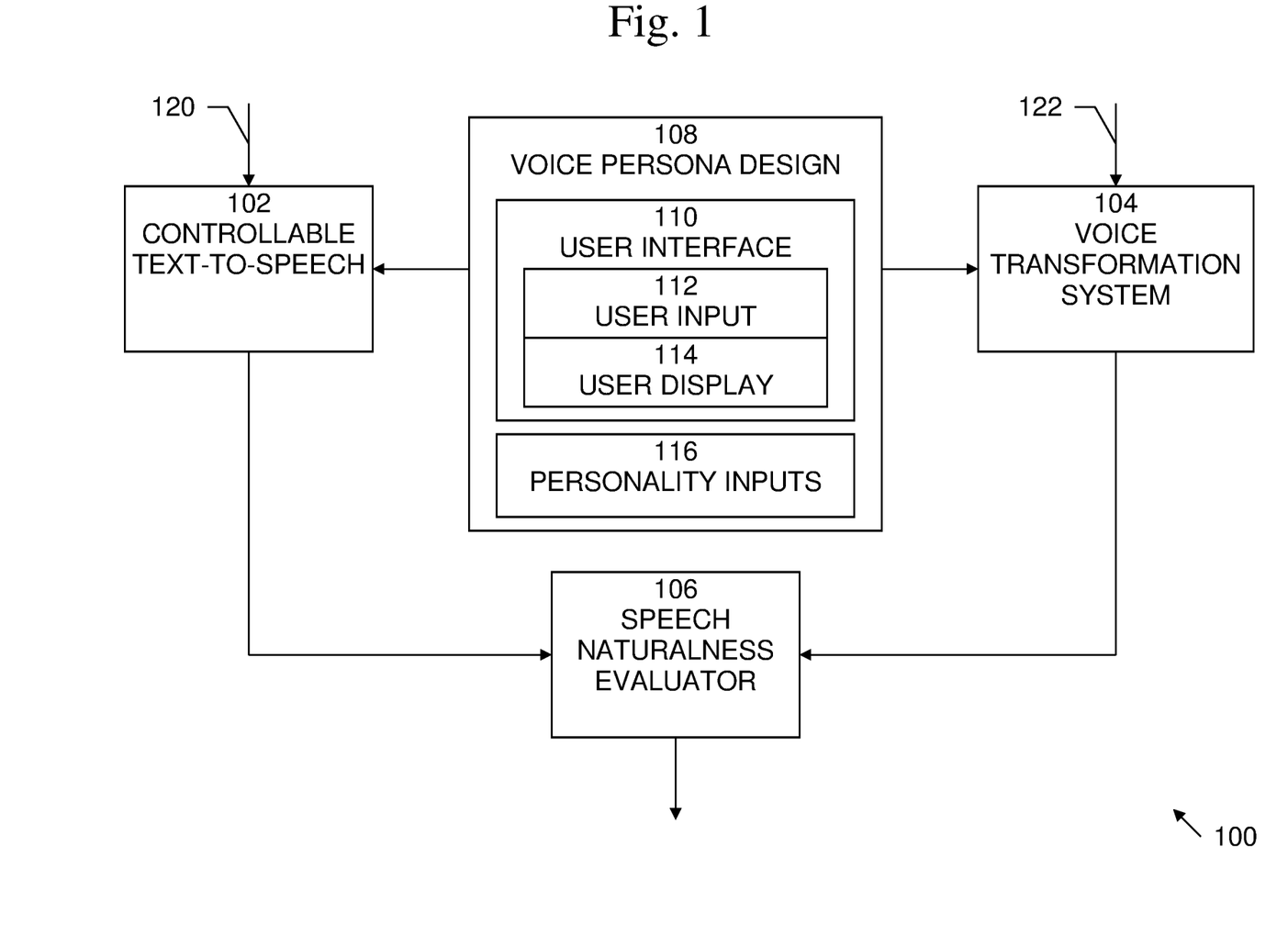
FIG. 1 illustrates an exemplary system in which the present systems and methods may be implemented.

An exemplary block diagram of a system 100, according to embodiments of the present techniques, is shown in FIG. 1. In this example, system 100 may include "persona speech generation" block such as a controllable Text-To-Speech (TTS) system 102 or a Voice transformation system 104, speech naturalness evaluator 106, and voice persona design block 108. In the example shown in FIG. 1, both a controllable TTS system 102 and a voice transformation system 104 are shown, and embodiments of the present systems and methods may include both. However, embodiments may instead include only one of controllable TTS system 102 and voice transformation system 104. Each of controllable TTS system 102 and voice transformation system 104 may include hardware, such as a computer system or computing device, and/or software, such as may be implemented in a computer system or computing device, to perform conversion of input data, such as textual data 120, which may be input to controllable TTS system 102 or speech audio data 122, which may be input to voice transformation system 104, to a desired persona's generated speech. The conversion to desired persona's audio speech signals may utilize a number of parameters that may be controlled using voice persona design block 108. Such parameters may include vocal register, pitch, phonation, speed, voice timber, such as hoarseness, growling, trembling, etc., mood, etc. Voice persona design block 108 may include hardware, such as a computer system or computing device, and/or software, such as may be implemented in a computer system or computing device, to control and adjust the parameters used by controllable TTS system 102 for conversion of textual and/or voice transformation system 104 for transformation of audio data to a desired persona's generated audio speech signals.

Voice persona design block 108 may provide a user interface 110, which may include user input unit 112 and user display unit 114. User input unit 112 may accept user input for controlling voice persona settings and user display unit 114 may display settings, potential settings, allowable settings, and settings ranges for persona settings. In embodiments, user input unit 112 and user display unit 114 may be separate units, or user input unit 112 and user display unit 114 may be combined in an integrated user interface 110. The voice persona settings determined by user interface 110 may control the personality inputs transmitted to controllable TTS system 102 and/or voice transformation system 104, in order to control, adjust, and modify the output speech from controllable TTS system 102 and/or voice transformation system 104.

Speech naturalness evaluator 106 may determine the naturalness of a desired persona's generated audio speech signals generated by TTS system 102 and/or voice transformation system 104. Speech naturalness evaluator 106 may be trained using both human speech and non-human speech, such as non-human speech that is artificially generated from human speech, to return speech naturalness decisions and optionally confidence levels for those decisions.

Figure 2:
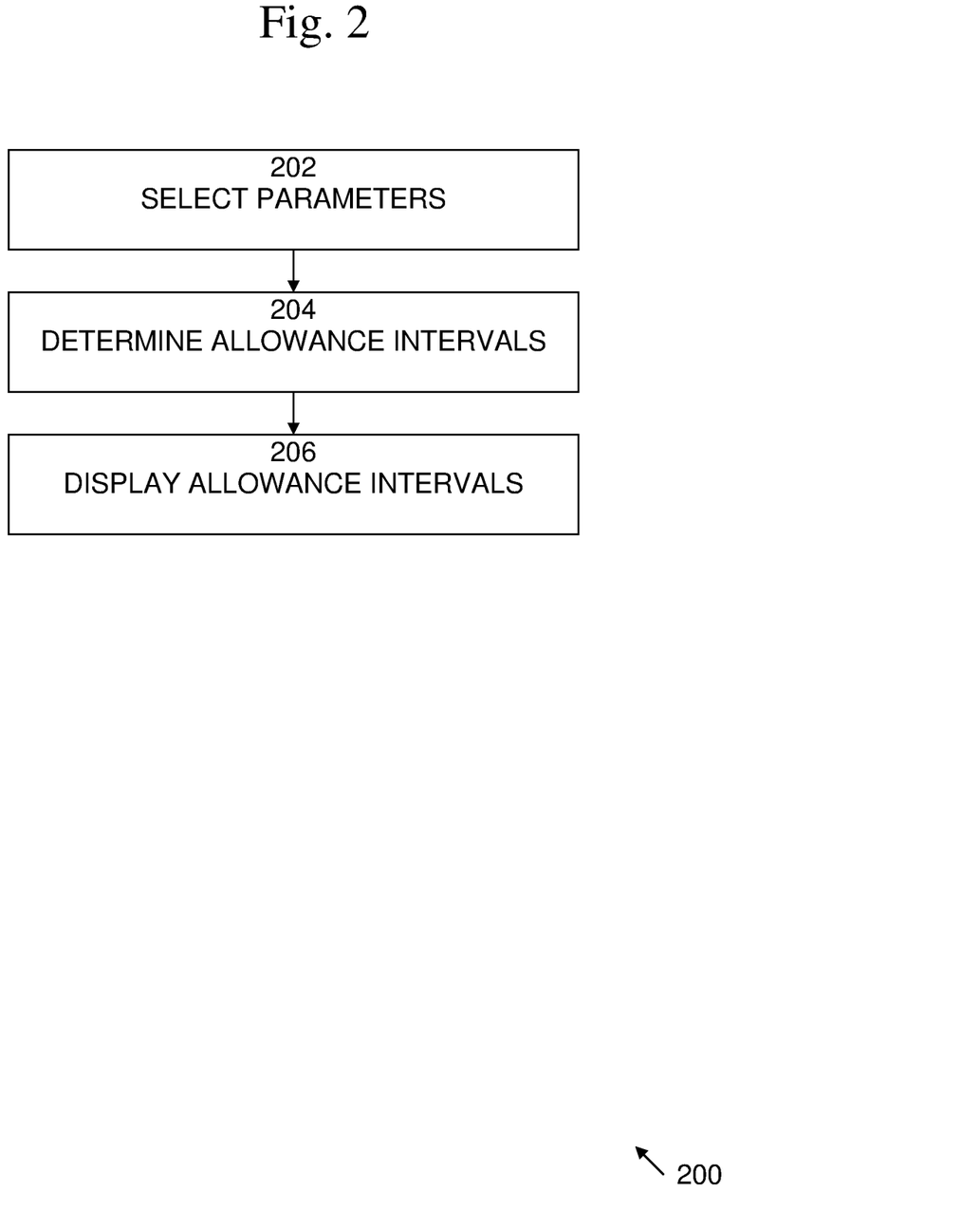
FIG. 2 is an exemplary data flow diagram of a process according to embodiments of the present systems and methods.
Figure 3:
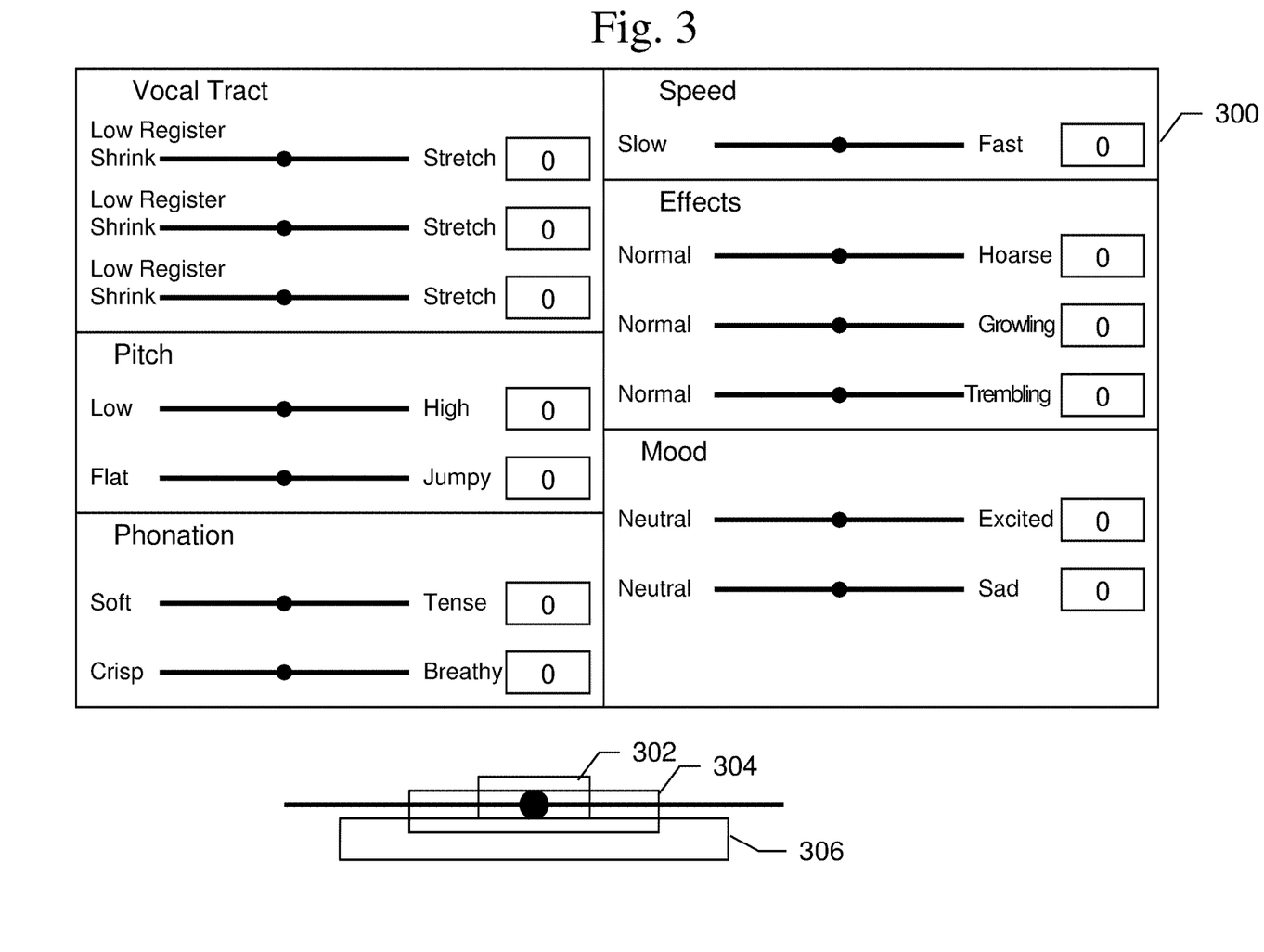
FIG. 3 is an exemplary illustration of a user interface according to embodiments of the present systems and methods.

An exemplary flow diagram of a process 200, according to embodiments of the present techniques, is shown in FIG. 2. In this example, a user, such as a Voice Personality designer, may create a certain voice personality P1, as determined by a certain parameter values $\{S1[0] \ldots S1[N]\}$, using, for example, a voice morphing GUI control panel, such as that shown in FIG. 3. In the exemplary voice morphing GUI control panel 300 shown in FIG. 3, each displayed parameter may have a confined range of possible values 302, 304, 306 that may vary from an initial personality P0, for example, initial parameter values $\{S0[0] \ldots S0[N]\}$. Typically, not all of the possible settings of the GUI controls that vary the parameters from the initial P0 settings may result in speech output that is 1) natural sounding human speech 2) of high quality (e.g. free of artifacts) and 3) define a distinct personality, compared to P0.

Process 200 begins with 202, in which a user may select a parameter (or several parameters) to modify. At 204, allowance intervals may be determined. For example, for each selected j-th parameter, allowance intervals may be determined according to $P0[j]-d\_left <= P1[j] <= P0[j]+d\_right$, while preserving at least one feature of the speech, such as high quality speech, human-like personas, and the same persona as P0, based on a given set of input speech samples designed for a transformation. At 206, the determined allowance intervals for each parameter may be displayed on the selected controls for those parameters, according to, for example, a predetermined color legend. In embodiments, the intensity of the colors within the allowance intervals may indicate a confidence that the speech features have been preserved.

Figure 4:
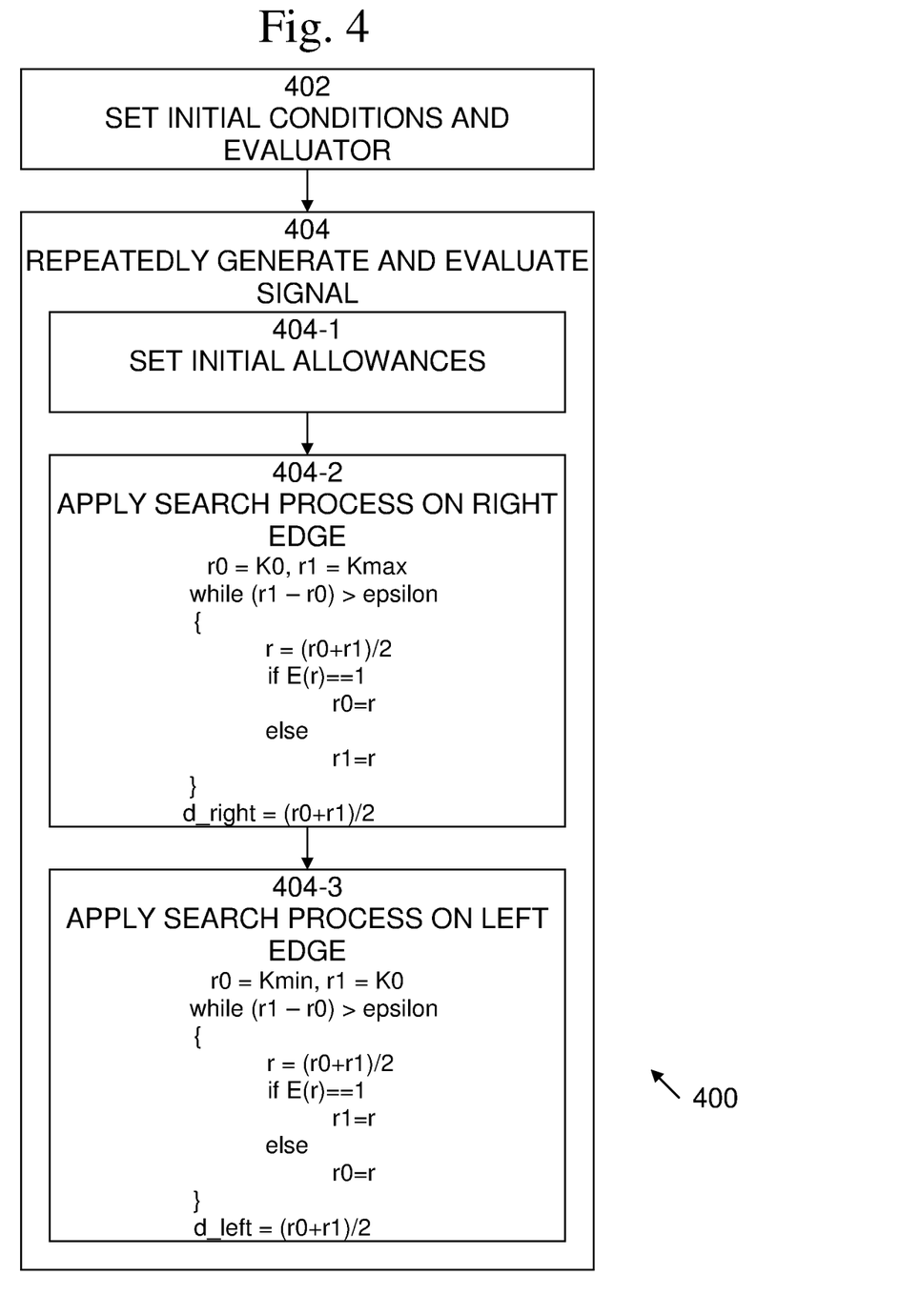
FIG. 4 is an exemplary data flow diagram of a process according to embodiments of the present systems and methods.

An exemplary flow diagram of a process of allowance interval determination 204, shown in FIG. 2, is shown in FIG. 4. Process 400 begins with 402, in which initial conditions and an evaluator may be set. For example, S1 may be a transformed audio speech signal under evaluation, S0 may be an initial audio signal and E(S0,S1) may be an evaluator that generates a binary decision (and, optionally, a confidence value) about the following hypotheses: (1) the quality of S1 is not worse than that of S0, (2) S1 is not less human-like then S0, and (3) S1 is the same persona as S0.

At 404, signal S1 may be repeatedly generated and evaluated to determine the allowance intervals, using the evaluator E(S0,S1). For use in describing process 404, E(K) may be the result of evaluation of a modified persona, K may be a parameter for allowance interval determination of the K-th range [K min, K max], and the initial condition may be (P0[K]): K0. Then within process 404, at 404-1, initial allowances d_left=d_right=0 may be set. At 404-2 and 404-3, a search process, for example, a binary search, may be performed separately on the left 404-3 and right 404-2 edges of the allowance interval to find the rightmost and the leftmost points that have E(S0,S1)=1. For example, in FIG. 4, exemplary pseudocode for a search process for the right edge is shown at 404-2. Likewise, in FIG. 4, exemplary pseudocode for a search process for the left edge is shown at 404-3.

In embodiments, examples of allowance evaluators may include speech quality evaluators and same person evaluators. For example, a speech quality evaluator may estimate a mean opinion score (MOS) grade difference between S1 and S0. If the difference is negative and larger in its absolute value then a predetermined (user-defined) MOS score allowance, then False may be returned; otherwise True may be returned. Likewise, a same person evaluator may apply one of various speaker recognition methods to assess where S1 is the same person as S0. Alternately, a distance between speaker embedding vectors may be evaluated for S1 and S0, and if the distance is less than a predetermined (user-defined) similarity allowance, then True may be returned; otherwise False may be returned.

Figure 5:
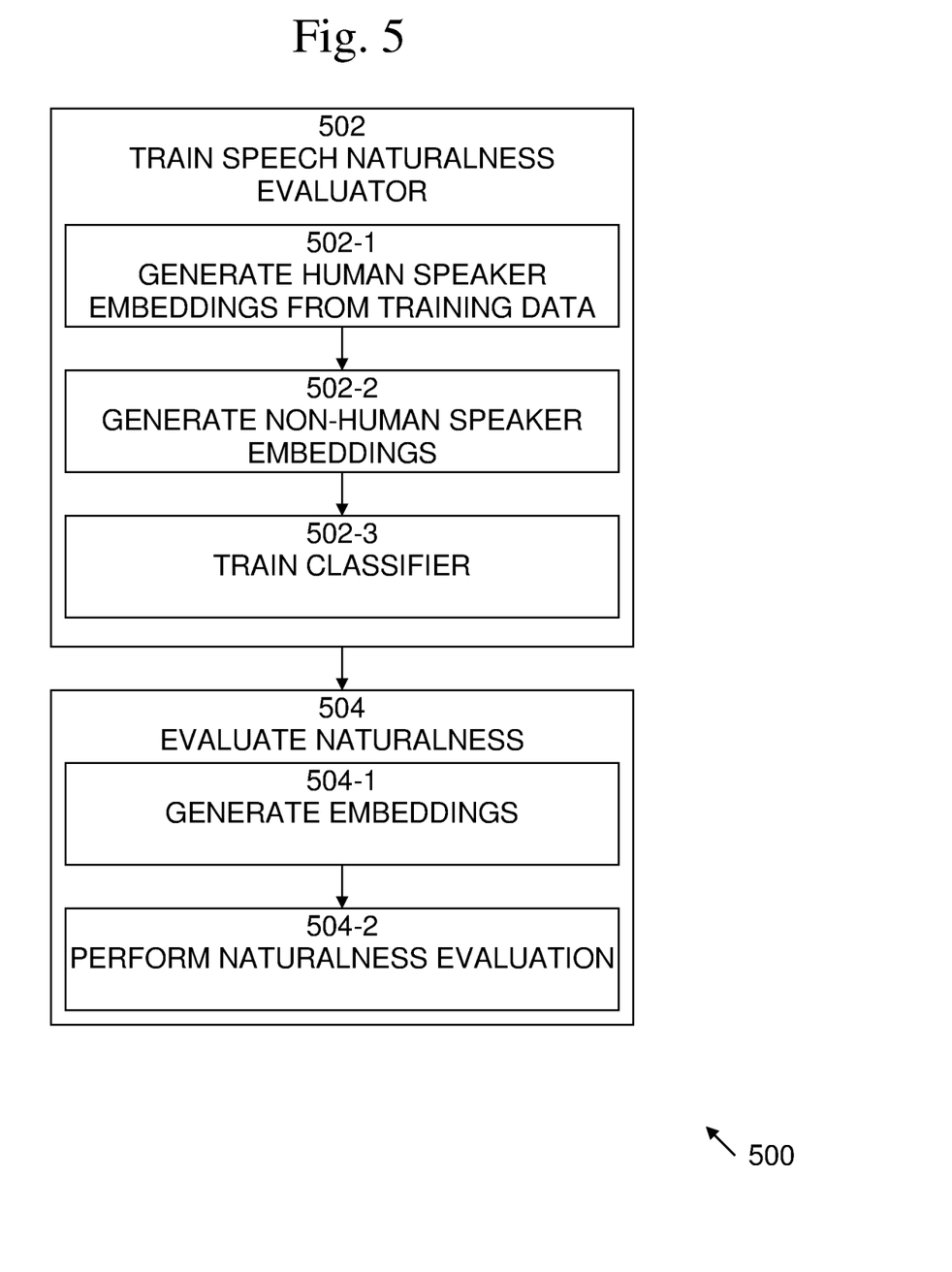
FIG. 5 is an exemplary data flow diagram of a process according to embodiments of the present systems and methods.

An exemplary flow diagram of a process 500 speech naturalness evaluator training and speech naturalness evaluation is shown in FIG. 5. Process 500 begins with 502, in which speech naturalness evaluator, shown in FIG. 1, may be trained. Speech naturalness evaluator training 502 begins with 502-1, in which human speaker embeddings may be generated. Multiple utterances (for example more than 10) of multiple speakers (for example more then 10,000) may be fed into a speaker embedding system to produce the human speaker embeddings $\{x_i\}$ which may serve as a positive example for a classifier training.

At 502-2, non-human speaker embeddings may be generated. Multiple (for example the same amount as the positive examples) "non-human" embedding vectors may generated by $\hat{y}=\Sigma_i \lambda_i \overline{x}_i$ s.t. $\Sigma_i \lambda_i \geq 1 \in$, where $\in$ is a small constant, e.g. $\in=0.1$ and $\overline{x}_i$ is a random subset of the positive examples. The non-human speaker embeddings may serve as negative examples for classifier training.

At 502-3, the classifier may be trained using the negative and the positive examples. The classifier may be, for example, a non-linear (kernel) support vector machine (SVM) classifier or an artificial neural network (ANN) probabilistic classifier, terminated with a logistic regression layer.

Once the speech naturalness evaluator 106 has been trained, at 504, the naturalness of speech generated by controllable TTS system 102 and/or voice transformation system 104 may be evaluated. Process 504 begins with 504-1, in which speaker embeddings of speech generated by controllable TTS system 102 and/or voice transformation system 104 may be generated. The evaluation of S1 persona naturalness may be based on one or more generated speech sentences, each one represented by an appropriate speaker embedding. At 504-2, the speaker embeddings pass through speech naturalness evaluator 106, shown in FIG. 1, to return the binary decisions and optionally confidence levels for those decisions. For example, in the case of a probabilistic classifier C(S) (such as an ANN-based), evaluator E(S0, S1) may return True if C(S0)>=0.5 AND C(S1)>=0.5 OR C(S1) >=C(S0)–d, where d is a predetermined (user-defined) allowance, otherwise evaluator E(S0, S1) may return False. In the case of a strict binary classifier C(S), evaluator E(S0,S1) may return True if C(S0)=1 AND C(S1)=1, otherwise evaluator E(S0,S1) may return False.

Figure 6:
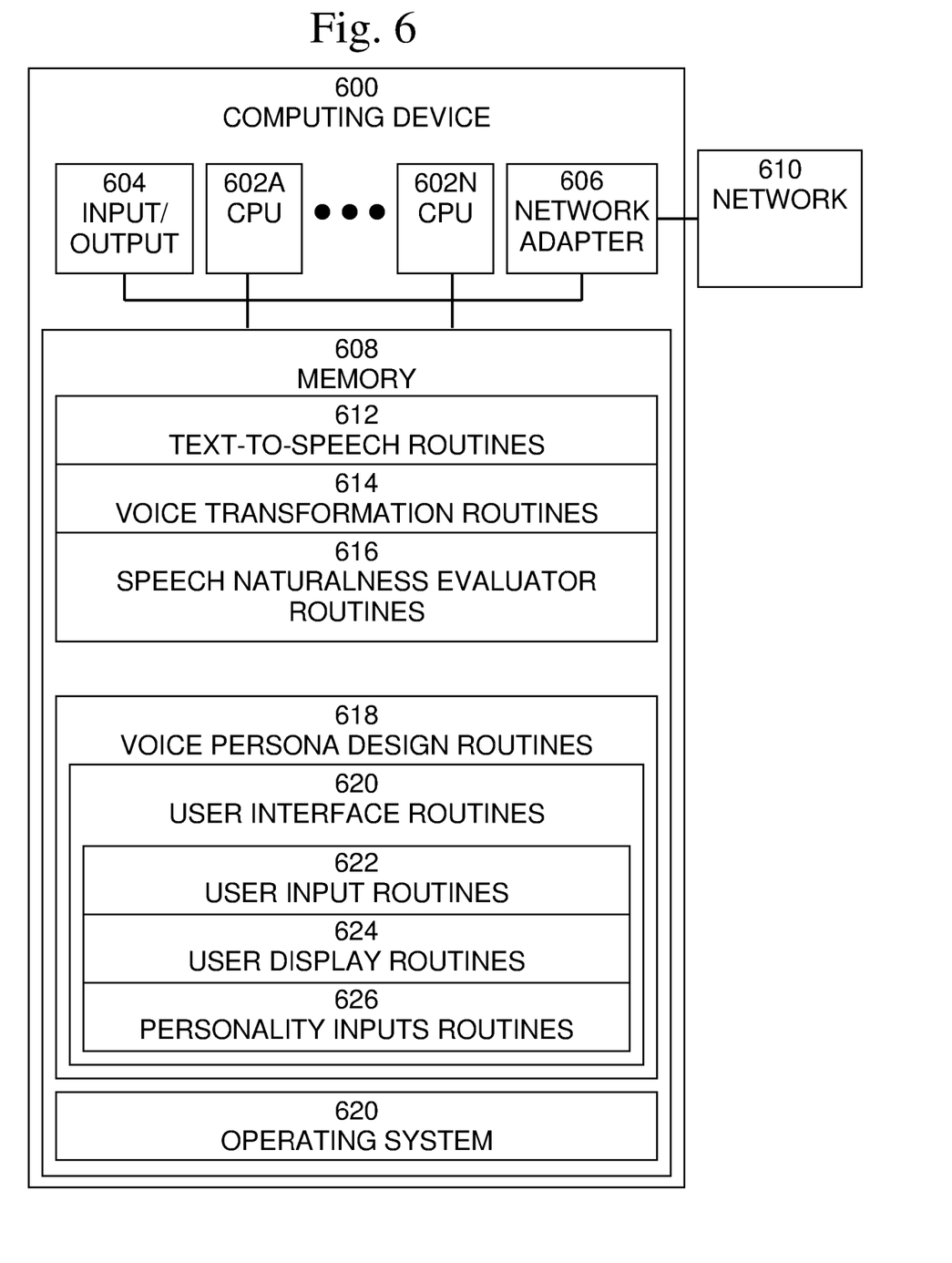
FIG. 6 is exemplary block diagram of a computer system in which processes involved in the embodiments described herein may be implemented.

An exemplary block diagram of a computer system 600, in which processes involved in the embodiments described herein may be implemented, is shown in FIG. 6. Computer system 600 may be implemented using one or more programmed general-purpose computer systems, such as embedded processors, systems on a chip, personal computers, workstations, server systems, and minicomputers or mainframe computers, or in distributed, networked computing environments. Computer system 600 may include one or more processors (CPUs) 602A-602N, input/output circuitry 604, network adapter 606, and memory 608. CPUs 602A-602N execute program instructions in order to carry out the functions of the present communications systems and methods. Typically, CPUs 602A-602N are one or more microprocessors, such as an INTEL CORE® processor. FIG. 6 illustrates an embodiment in which computer system 600 is implemented as a single multi-processor computer system, in which multiple processors 602A-602N share system resources, such as memory 608, input/output circuitry 604, and network adapter 606. However, the present communications systems and methods also include embodiments in which computer system 600 is implemented as a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system 600 is programmed to perform. In the example shown in FIG. 6, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 6, memory 608 may include input conversion controllable TTS routines 612, voice transformation routines 614, speech naturalness evaluator routines 616, voice persona design routines 618, and operating system 624. Controllable TTS routines 612 may include software routines to perform conversion of input data, such as textual data, to a desired persona's generated speech, as described above. Voice transformation routines 614 may include software routines to perform conversion of the input data, such as speech audio data to a desired persona's generated speech, as described above. Speech naturalness evaluator routines 616 may include software routines to perform evaluation of the naturalness of the desired persona's generated speech, as described above. Voice persona design routines 618 may include software routines to control and adjust the parameters used in signal generation for conversion of phoneme data to audio speech signals. Voice persona design routines 618 may include user interface routines 620, which may include user input routines 622, user display routines 624, and personality inputs routines 626. User input routines 622 may include software routines to accept user input for controlling voice persona settings. User display routines 624 may include software routines to display settings, potential settings, allowable settings, and settings ranges for persona settings. Personality inputs routines 626 may include software routines to control the personality inputs that control, adjust, and modify the voice persona generate by signal generation for conversion of phoneme data to audio speech signals. Operating system 624 may provide overall system functionality.

As shown in FIG. 6, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for voice persona generation implemented in a computer system comprising a processor, memory accessible by the processor, and computer program instructions stored in the memory and executable by the processor, the method comprising:
    displaying, at the computer system, to a user, a plurality of user-selectable voice persona parameters that control features of a synthesized voice signal, and displaying, in conjunction with each of at least some of the plurality of user-selectable voice persona parameters, voice transformation allowance intervals of the voice persona parameters, wherein the displayed voice transformation allowance interval ranges are determined by:
        a) generating a synthesized voice signal; and
        b) evaluating the synthesized voice signal based on a quality of the synthesized voice signal, a naturalness of the synthesized voice signal, and a persona of the synthesized voice signal, wherein the naturalness of the synthesized voice signal is determined by a binary classifier;
    accepting, at the computer system, from a user, a selection of at least one user-selectable voice persona parameter; and
    generating, at the computer system, a synthesized voice signal based on the selected at least one user-selectable voice persona parameter.

2. The method of claim 1, wherein the displayed voice transformation allowance interval ranges are further determined by:
    performing a binary search process including repeating a) and b) to determine at least one edge of a voice transformation allowance interval.

3. The method of claim 2, wherein the binary classifier is trained using at least some artificially generated negative examples.

4. The method of claim 3, wherein the binary classifier is trained also using at least some human speech as positive examples, the positive examples and the negative examples are represented by embedding vectors, and embedding vectors of the negative examples are selected outside of a convex hull of the embedding vectors of the positive examples.

5. The method of claim 4, wherein the classifier is a non-linear (kernel) support vector machine classifier or an artificial neural network probabilistic classifier.

6. The method of claim 1, wherein the voice transformation allowance interval is displayed superimposed on a display of a user-selectable voice persona parameter.

7. The method of claim 1, wherein the voice transformation allowance interval is displayed adjacent to a display of a user-selectable voice persona parameter.

8. A system for voice persona generation, the system comprising a processor, memory accessible by the processor, and computer program instructions stored in the memory and executable by the processor to perform:

displaying, on a display of the system, to a user, a plurality of user-selectable voice persona parameters that control features of a synthesized voice signal, and displaying, in conjunction with each of at least some of the plurality of user-selectable voice persona parameters voice transformation allowance intervals of the voice persona parameters, wherein the displayed voice transformation allowance interval ranges are determined by:
  a) generating a synthesized voice signal; and
  b) evaluating the synthesized voice signal based on a quality of the synthesized voice signal, a naturalness of the synthesized voice signal, and a persona of the synthesized voice signal, wherein the naturalness of the synthesized voice signal is determined by a binary classifier;
accepting, at an input interface of the system, from a user, a selection of at least one user-selectable voice persona parameter; and
generating a synthesized voice signal based on the selected at least one user-selectable voice persona parameter.

9. The system of claim 1, wherein the displayed voice transformation allowance interval ranges are further determined by:
  performing a binary search process including repeating a) and b) to determine at least one edge of a voice transformation allowance interval.

10. The system of claim 9, wherein the binary classifier is trained using at least some artificially generated negative examples.

11. The method of claim 10, wherein the binary classifier is trained also using at least some human speech as positive examples, the positive examples and the negative examples are represented by embedding vectors, and embedding vectors of the negative examples are selected outside of a convex hull of the embedding vectors of the positive examples.

12. The system of claim 11, wherein the classifier is a non-linear (kernel) support vector machine classifier or an artificial neural network probabilistic classifier.

13. The system of claim 9, wherein the voice transformation allowance interval is displayed superimposed on a display of a user-selectable voice persona parameter.

14. The system of claim 9, wherein the voice transformation allowance interval is displayed adjacent to a display of a user-selectable voice persona parameter.

15. A computer program product for voice persona generation, the computer program product comprising a non-transitory computer readable storage having program instructions embodied therewith, the program instructions executable by a computer system comprising a processor, memory accessible by the processor, and computer program instructions stored in the memory and executable by the processor, to cause the computer to perform a method comprising:
  displaying, at the computer system, to a user, a plurality of user-selectable voice persona parameters that control features of a synthesized voice signal, and displaying, in conjunction with each of at least some of the plurality of user-selectable voice persona parameters voice transformation allowance intervals of the voice persona parameters, wherein the displayed voice transformation allowance interval ranges are determined by:
    a) generating a synthesized voice signal; and
    b) evaluating the synthesized voice signal based on a quality of the synthesized voice signal, a naturalness of the synthesized voice signal, and a persona of the synthesized voice signal, wherein the naturalness of the synthesized voice signal is determined by a binary classifier;
  accepting, at the computer system, from a user, a selection of at least one user-selectable voice persona parameter; and
  generating, at the computer system, a synthesized voice signal based on the selected at least one user-selectable voice persona parameter.

16. The computer program product of claim 15, wherein the displayed voice transformation allowance interval ranges are further determined by:
  performing a binary search process including repeating a) and b) to determine at least one edge of a voice transformation allowance interval.

17. The computer program product of claim 16, wherein the binary classifier is trained using at least some artificially generated negative examples.

18. The computer program product of claim 17, wherein the binary classifier is trained also using at least some human speech as positive examples, the positive examples and the negative examples are represented by embedding vectors, and embedding vectors of the negative examples are selected outside of a convex hull of the embedding vectors of the positive examples.

19. The computer program product of claim 18, wherein the classifier is a non-linear (kernel) support vector machine classifier or an artificial neural network probabilistic classifier.

20. The computer program product of claim 15, wherein the voice transformation allowance interval is displayed as one of:
  superimposed on a display of a user-selectable voice persona parameter; or
  adjacent to a display of a user-selectable voice persona parameter.

* * * * *